(12) United States Patent
Shankar et al.

(10) Patent No.: US 9,245,105 B1
(45) Date of Patent: Jan. 26, 2016

(54) VERIFICATION OF REMOTE JOB STATE FOR ACCESS CONTROL

(71) Applicant: Google Inc., Mountain View, CA (US)

(72) Inventors: Umesh Shankar, New York, NY (US); Glenn Edward Durfee, New York, NY (US); William Gary Conner, II, Flushing, NY (US); Scott Thomas Garriss, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/772,943

(22) Filed: Feb. 21, 2013

Related U.S. Application Data

(60) Provisional application No. 61/601,869, filed on Feb. 22, 2012.

(51) Int. Cl.
*G06F 21/44* (2013.01)
(52) U.S. Cl.
CPC ...................................... *G06F 21/44* (2013.01)
(58) Field of Classification Search
CPC ................ G06F 21/6218; G06F 21/62; G06F 2221/2141; G06F 21/44; H04L 63/0263; H04L 63/101
See application file for complete search history.

(56) References Cited

U.S. PATENT DOCUMENTS

| 7,865,603 | B2 | 1/2011 | Braddy et al. | |
|---|---|---|---|---|
| 8,176,561 | B1 * | 5/2012 | Hurst et al. | 726/25 |
| 8,261,320 | B1 | 9/2012 | Serenyi et al. | |
| 8,479,302 | B1 * | 7/2013 | Lin | 726/28 |
| 2007/0083935 | A1 * | 4/2007 | Uchikawa et al. | 726/26 |
| 2008/0168547 | A1 | 7/2008 | Cheeniyil et al. | |
| 2010/0319051 | A1 | 12/2010 | Bafna et al. | |
| 2012/0016721 | A1 * | 1/2012 | Weinman | 705/7.35 |
| 2013/0117313 | A1 * | 5/2013 | Miao et al. | 707/781 |

* cited by examiner

*Primary Examiner* — Andrew Nalven
*Assistant Examiner* — Mary Li
(74) *Attorney, Agent, or Firm* — Fox Rothschild LLP (57) ABSTRACT

A method of controlling access to one or more data resources may include receiving, from a client device by an authentication server device, a request to access a data resource. The request may include a job identifier associated with a job. The method may include transmitting, by the authentication server device to a scheduling server device, the job identifier, receiving, by the authentication server device from the scheduling server device, job information associated with the job, determining, by the authentication server device, whether at least a portion of the job information satisfies an access policy associated with the data resource, and granting the job access to the data resource in response to the at least a portion of the job information satisfying the access policy.

10 Claims, 4 Drawing Sheets

VERIFICATION OF REMOTE JOB STATE FOR ACCESS CONTROL

CROSS REFERENCE TO RELATED APPLICATION

This application claims the priority benefit of U.S. Provisional Patent Application No. 61/601,869, filed on Feb. 22, 2012, which is incorporated by reference in its entirety.

BACKGROUND

Hosted storage services, such as cloud-based storage services, store data on a server which is located at a facility that is remote from the locations where the data is generated or used. The remote servers are typically hosted by a third party, which allows the data's owner and authorized users to access the data over a communications network such as the Internet.

It is common for jobs to access data that is stored by hosted storage services. Typically, privileges associated with a job are based on the roles associated with the user under whose authority a job runs. Authorization of a job request is based on the associated role. For example, a certain user may have read access. As such, all jobs run by the user may only be granted read access.

However, it is possible that a server may only want to allow requests for certain types of jobs regardless of the privileges associated with the corresponding user. For example, a server may only want to allow requests from live production jobs and not others.

SUMMARY

In an embodiment, a method of controlling access to one or more data resources may include receiving, from a client device by an authentication server device, a request to access a data resource. The request may include a job identifier associated with a job. The method may include transmitting, by the authentication server device to a scheduling server device, the job identifier, receiving, by the authentication server device from the scheduling server device, job information associated with the job, determining, by the authentication server device, whether at least a portion of the job information satisfies an access policy associated with the data resource, and granting the job access to the data resource in response to the at least a portion of the job information satisfying the access policy.

In an embodiment, a method of controlling access to one or more data resources may include receiving, from a client device by an authentication server device, a request to access a data resource. The request may include a job identifier associated with a job. The method may include transmitting, by the authentication server device to a scheduling server device, the job identifier, receiving, by the authentication server device from the scheduling server device, job information associated with the job, determining, by the authentication server device, whether at least a portion of the job information satisfies an access policy associated with the data resource, and denying the job access to the data resource in response to the at least a portion of the job information not satisfying the access policy.

In an embodiment, a system for controlling access to one or more data resources may include a computing device and a computer-readable storage medium in communication with the computing device. The computer-readable storage medium may include one or more programming instructions that, when executed, cause the computing device to receive, from a client device, a request to access a data resource. The request may include a job identifier associated with a job. The computer-readable storage medium may include one or more programming instructions that, when executed, cause the computing device to transmit, to a scheduling server device, the job identifier, receive, from the scheduling server device, job information associated with the job, determine whether at least a portion of the job information satisfies an access policy associated with the data resource, and grant the job access to the data resource in response to the at least a portion of the job information satisfying the access policy.

In an embodiment, a system for controlling access to one or more data resources may include a computing device and a computer-readable storage medium in communication with the computing device. The computer-readable storage medium may include one or more programming instructions that, when executed, cause the computing device to receive, from a client device, a request to access a data resource. The request may include a job identifier associated with a job. The computer-readable storage medium may include one or more programming instructions that, when executed, cause the computing device to transmit, to a scheduling server device, the job identifier, receive, from the scheduling server device, job information associated with the job, determine whether at least a portion of the job information satisfies an access policy associated with the data resource, and deny the job access to the data resource in response to the at least a portion of the job information not satisfying the access policy.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

For the purposes of this document, a "computing device" refers to a device that includes a processor and tangible, computer-readable memory. The memory may contain programming instructions that, when executed by the processor, cause the device to perform one or more operations according to the programming instructions. Examples of computing devices include personal computers, gaming systems, televisions, and portable electronic devices such as smartphones, personal digital assistants, cameras, tablet computers, laptop computers, media players and the like.

An "administrative policy" refers to one or more rules, policies, guidelines and/or the like governing access by a client device to one or more administered resources.

An "authentication server device" refers to a computing device that is configured to determine whether a client device complies with an administrative policy. An authentication server device may include, without limitation, a server, a mainframe computer, a networked computer, a processor-based device, a virtual machine and/or the like.

A "client device" refers to a computing device that is configured to access one or more administered resources over a network. A client device may be a portable or stationary electronic device. A "client application" refers to an application program configured to instruct a client device to perform one or more tasks.

A "job" refers to a unit of work to be executed by a computing device. A job may include computer program, a portion of a computer program, or multiple computer programs that cooperate to perform one or more activities.

A "job set" refers to a category or other classification associated with a job. A job set may describe one or more jobs based on function, purpose and/or the like. Examples of job sets may include live production jobs, inactive jobs, email jobs, word processing jobs and/or the like.

A "scheduling server device" refers to a computing device that is configured to schedule one or more jobs. A scheduling server device may include, without limitation, a server, a mainframe computer, a networked computer, a processor-based device, a virtual machine and/or the like.

Figure 1:
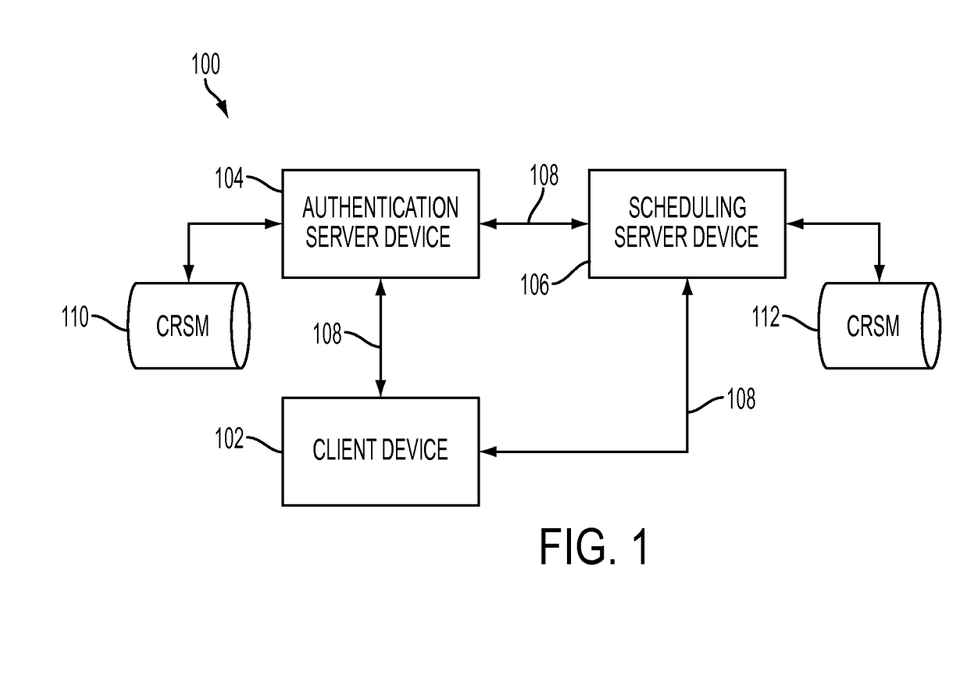
FIG. 1 illustrates an example system for authenticating server requests according to an embodiment.

FIG. 1 illustrates a system 100 for authenticating server requests according to an embodiment. As illustrated by FIG. 1, a system 100 may include a client device 102, an authentication server device 104 and a scheduling server device 106. The client device may be in communication with the authentication server device 104 and/or the scheduling server device 106 via one or more communication networks 108. The authentication server device 104 may be in communication with the scheduling server device 106 via one or more communication networks 108.

In an embodiment, a communication network 108 may be a local area network (LAN), a wide area network (WAN), a mobile or cellular communication network, an extranet, an intranet, the Internet and/or the like. In an embodiment, the communication network 108 may provide communication capability between the client device 102, the authentication server device 104 and/or the scheduling server device 106. The client device 102, the authentication server device 104 and/or the scheduling server device 106 may communicate across the network 108 using any suitable communications protocol, such as Transmission Control Protocol/Internet Protocol (TCP/IP), Hypertext Transfer Protocol (HTTP), Secure Shell Remote Protocol (SSH), Secure Sockets Layer Protocol (SSL), Transport Layer Security Protocol (TLS), Application Program Interfaces (API), or any other suitable protocol.

Although FIG. 1 illustrates a single client device, it is understood that more than one client device may be used within the scope of this disclosure.

In an embodiment, the authentication server device 104 may be in communication with a computer-readable storage medium 110. The computer-readable storage medium 110 may store information pertaining to an access policy. An access policy may include one or more rules defining which jobs or job sets are permitted to make certain resource requests or which jobs or job sets are permitted to perform actions on data resources or groups of data resources. Table 1 below is an example policy setting forth example jobs that are permitted to access certain data resources according to an embodiment. As illustrated by Table 1, a policy may specify that only a live email production job may access an email encryption key. Accordingly, if a live email production job requests an email encryption key, the request may be granted regardless of under what role the job is running.

TABLE 1

| Jobs | Data Resources |
|---|---|
| Email live production job | Email encryption key |
| Word processing live production job | Word processing encryption key |
| Calendar live production job | Calendar encryption key |

In an embodiment, an access policy may identify which users are authorized to perform actions on data resources or groups of data resources, and/or what actions may be performed on each resource or group. As used in this document, a user may be an individual or another identifier such as an invite token or an application identifier. In some embodiments, a policy may include an ordered list of entries. Each entry may include a job description, a scope, and/or a role. A scope may identify the users or groups of users who may access the resource or group. In some embodiments, a scope may also represent a token that can be presented to access the resource. Such a token may be distributed to one or more recipients whose user IDs may be unknown or nonexistent.

The roles—sometimes referred to as privileges—may identify the access permissions for the user or group. Table 2 below is a list of example roles that can be established in a policy for a data resource or data resource groups. Table 3 below is a list of example capabilities associated with certain roles that can be established in a policy for data resources. The example roles in Tables 2 and 3 are merely illustrative, and policies may establish any suitable roles for data resource groups and/or individual data resources.

TABLE 2

| Role | Capabilities |
|---|---|
| READER | Can list and access the group's contents. Cannot create, delete or modify resources. |
| WRITER | READ capabilities, plus the ability to create, modify and delete resources in the group. |
| OWNER | WRITE capabilities, plus the ability to read, write and modify the group's ACL. |

TABLE 3

| Role | Capabilities |
|---|---|
| READER | Can access the resource. |
| OWNER | Can read, write, and modify the resource or its ACL. |

Table 4 illustrates a list of example jobs, roles and data resources that may be included in a policy according to an embodiment.

TABLE 4

| Jobs | Role | Data Resources |
|---|---|---|
| Email live production job | OWNER | Email encryption key |
| Word processing live production job | OWNER, WRITER | Word processing encryption key |

TABLE 4-continued

| Jobs | Role | Data Resources |
| --- | --- | --- |
| Calendar live production job | OWNER, WRITER | Calendar encryption key |

As illustrated by Table 4, a policy may identify both the type of job as well as the role under which the job is running that is required for the job to be permitted to access a data resource.

In an embodiment, the scheduling server device 106 may be in communication with a computer-readable storage medium 112. The computer-readable storage medium 112 may store a job database. A job database may be a collection of information pertaining to one or more jobs. In an embodiment, the job for which information is stored in a job database may be a job that was launched by the scheduling server. The stored information may include, without limitation, the client device on which the job is executing, a job name, a job identifier, a role associated with the job, one or more job sets to which the job belongs, one or more binaries associated with the job, data associated with the job, one or more command line arguments associated with the job, one or more dependencies associated with the job, a software version associated with the job, one or more security settings associated with the computing device on which the job executes, and/or the like. Additional and/or alternate information may be used within the scope of this disclosure.

Figure 2:
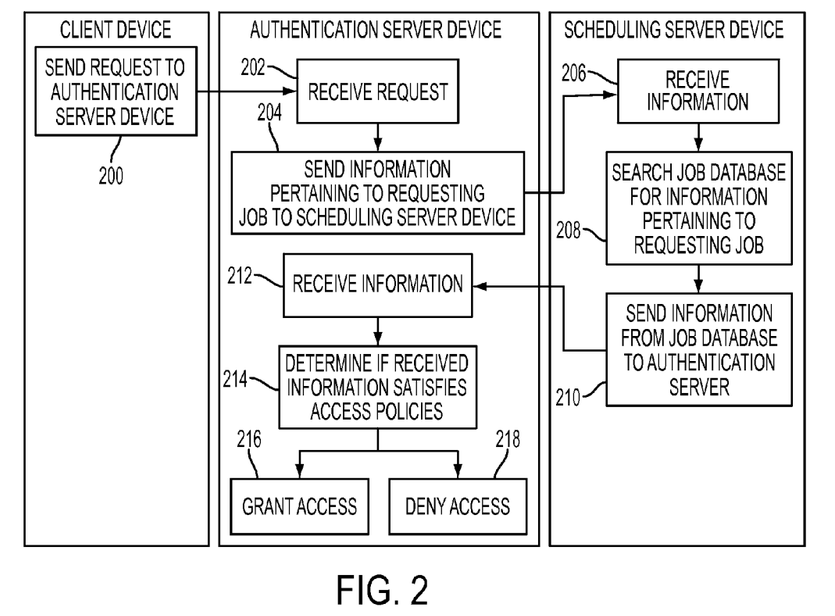
FIG. 2 illustrates an example of a method for authenticating a request according to an embodiment.

FIG. 2 illustrates an example of a method for authenticating a request according to an embodiment. As illustrated by FIG. 2, a client device may send 200 a request to an authentication server device. The request may be a request by one or more jobs for access to one or more data resources. In an embodiment, the request may include an identifier associated with the client device and/or the job that is requesting access. An identifier may include a job name or other unique identifier associated with the job. In an embodiment, the request may include an identifier associated with the resource or resources to which the client device is requesting access. The access request may include an encrypted password or other encrypted information.

The authentication server device may receive the request 202, and may verify 204 the request. In an embodiment, the authentication server device may send 206 information pertaining to the requesting job to the scheduling server device. For example, the authentication server device may send 206 a job identifier associated with the requesting job to the scheduling server device.

In an embodiment, the scheduling server device may receive 208 the information, and search 210 the job database for information pertaining to the requesting job. For example, the scheduling server device may search 210 the job database for information pertaining to the job associated with the job identifier that is received from the authentication server device. The scheduling server may send 212 at least a portion of the stored information pertaining to the requesting job to the authentication server.

In an embodiment, the authentication server device may receive 214 the job information from the scheduling server device. The authentication server device may determine 216 if at least a portion of the received job information satisfies one or more access policies associated with the data resource being requested. The authentication server device may compare 216 at least a portion of the received job information to one or more access policies. If the received job information satisfies the access policy, the request may be granted. If the received job information does not satisfy the access policy, the request may be denied.

By way of example, a job running on a client device named "EmailJob1" may request access to an email encryption key. The client device may send the request to the authentication server device. The request may include the name of the job requesting access to the email encryption key. The authentication server device may send the name of the requesting job to the scheduling server device. In an embodiment, the scheduling server device may have launched the job. The scheduling server device may search its job database for information pertaining to the requesting job. Table 5 illustrates example information associated with EmailJob1 that may be stored in a job database. As illustrated by Table 5, the job information may include data indicating on which client device the job is running, a role associated with a user under whose authority the job is running, and one or more job sets to which the requesting job belongs. Additional and/or alternate job information may be stored in a job database within the scope of this disclosure.

TABLE 5

| Job | Client Device | Role | Job Set |
| --- | --- | --- | --- |
| EmailJob1 | Client Device A | OWNER | Email live production jobs |

The scheduling server device may send at least a portion of the job information to the authentication server device. The authentication server device may compare at least a portion of the received information to one or more access policies associated with the data resource to which access was requested to determine whether the one or more access policies are satisfied. Table 6 illustrates an example of an access policy associated with an email encryption key according to an embodiment. As illustrated by Table 6, an access policy may specify which job sets are authorized to access a data resource.

TABLE 6

| Data Resource | Authorized Job Sets |
| --- | --- |
| Email encryption key | Email live production jobs |

In an embodiment, the authentication server device may compare the job sets to which the requesting job belongs to the job sets that are permitted access to the data resource. If the requesting job is associated with a job set that is permitted to access the data resource, the access policy may be satisfied, and the authentication server device may grant 216 the requesting job access to the data resource. If the requesting job is not associated with a job set that is permitted to access the data resource, the access policy may not be satisfied, and the authentication server device may deny 218 the requesting job access to the data resource. For example, as illustrated by Table 5, EmailJob1 is associated with the job set "email live production jobs." The access policy illustrated in Table 6 permits jobs associated with the job set "email live production jobs" to access the email encryption key data resource. As such, the request by the EmailJob1 job for access to the email encryption key may be granted.

In an embodiment, an authentication server device may verify an access request for a data resource based on a combination of the job set or sets to which the requesting job belongs as well as other information associated with a job. For example, an authentication server device may verify an access request for a data resource based on a combination of the job set or sets to which the requesting job belongs and a role associated with a user under whose authority the job is being run. Table 7 illustrates an example of an access policy associated with an email encryption key according to an embodiment. As illustrated by Table 7, an email encryption key may be accessed by a job associated with the job set "email live production jobs" and that is being run under the authority of a user associated with the role of "Owner."

In an embodiment, an authentication server device may verify an access request for a data resource based on, at least in part, a location associated with a job. For example, only jobs running at a certain authorized location may be granted access to certain data resources. An authorized location may include a geographic location, such as a city, state, country and/or the like. In an embodiment, an authorized location may include a building, an office, a department and/or the like.

In an embodiment, an authentication server device may verify an access request for a data resource based on, at least in part, one or more binaries associated with the job, data associated with the job, one or more command line arguments associated with the job, one or more dependencies associated with the job, a software version associated with the job, one or more security settings associated with the computing device on which the job executes and/or the like. Additional and/or alternate job sets and/or roles may be used within the scope of this disclosure.

TABLE 7

| Data Resource | Authorized Job Sets | Authorized Role |
| --- | --- | --- |
| Email encryption key | Email live production jobs | Owner |

In an embodiment, if the authentication server device grants access by a job to a data resource, the authentication server device may send a notification to the client device. The notification may indicate that access has been granted. Alternatively, the authentication server device may not send a notification to the client device, but may automatically grant access to the data resource.

In an embodiment, if the authentication server device denies access by a job to a data resource, the authentication server device may send a notification to the client device. The notification may identify the requesting job, the data resource or resources to which access is requested, and/or an indication that access has been denied because the job is not authorized to access the data resource. In an embodiment, one or more auditing and/or security-related services may be notified if access to a data resource is denied. For example, the authentication server device may send a notification to one or more auditing and/or security-related services. A notification may identify the requesting job, the data resource or resources to which access is requested, and/or an indication that access has been denied because the job is not authorized to access the data resource.

Figure 3:
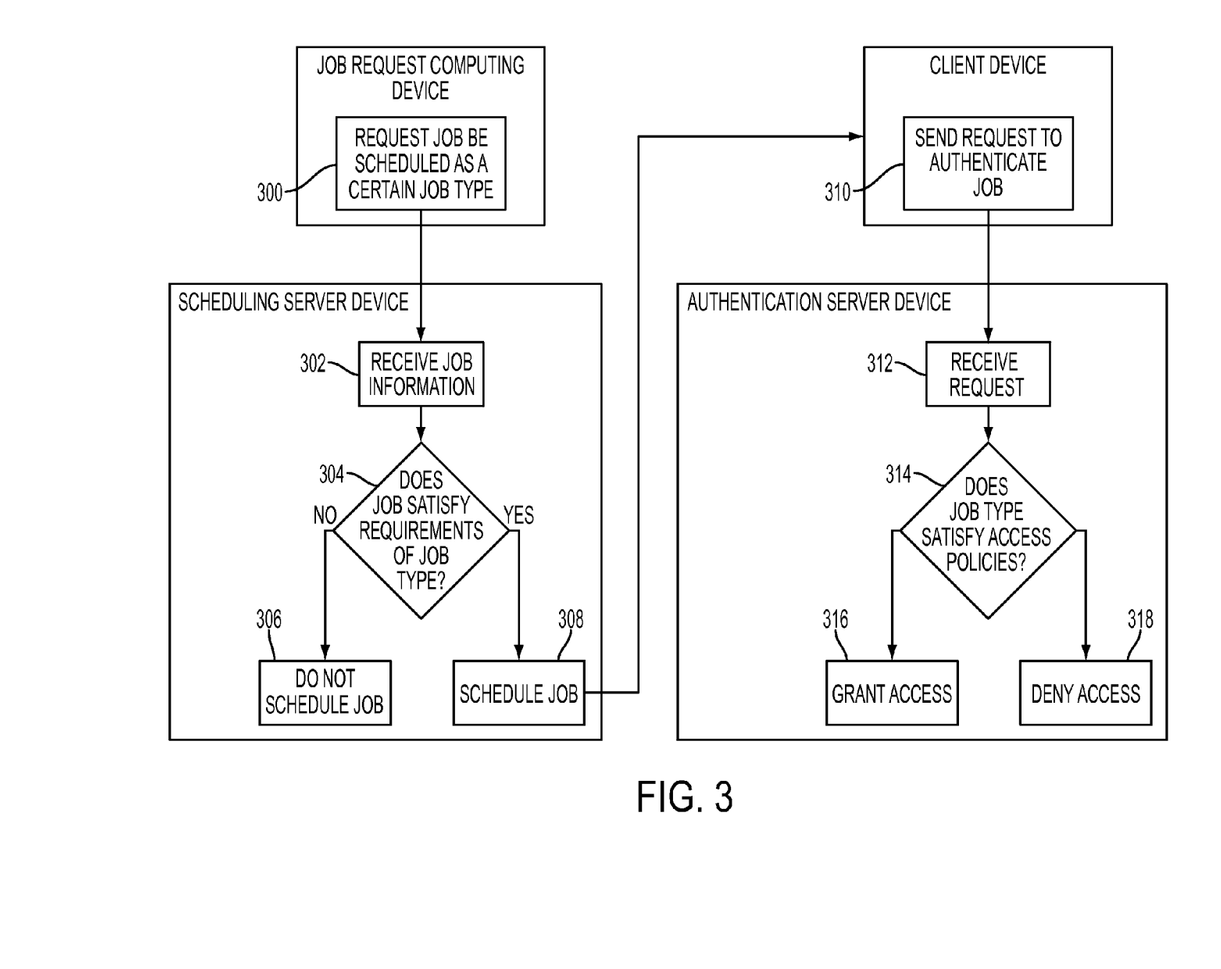
FIG. 3 illustrates an example method for authenticating a request according to an embodiment

FIG. 3 illustrates an example of an alternate method for authenticating a request. In an embodiment, a job may be pre-approved before the job is scheduled or launched. A scheduling server may only schedule jobs under a requested job type if the corresponding job information satisfies one or more requirements associated with the requested job type. In contrast to on-demand queries for job information from a job database, such as, for example, the approach illustrated in FIG. 2, certain job types may be assumed to be pre-verified when they contact an authentication server device. The authentication server device may make access control decisions based on the job type.

As illustrated by FIG. 3, a job request computing device may request 300 that a job be scheduled as a certain type of job. A scheduling server device may receive 302 information pertaining to the requested job. For example, a scheduling server device may receive 302 information pertaining to a job from the job request device.

In an embodiment, the scheduling server device may determine 304 if the received job information satisfies one or more requirements to be scheduled as the requested job type. If the received job information does not satisfy the one or more requirements, the job may not 306 be scheduled. If the received job information does satisfy the one or more requirements, the job may be scheduled 308 as the requested job type.

In an embodiment, a client device may send 310 a request to authenticate the job to an authentication server device. The authentication server device may receive 312 the request, and may determine 314 if the job type associated with the job satisfies one or more access policies. In an embodiment, if the job type satisfies the one or more access policies, the job may be granted 316 access. If the job type does not satisfy the one or more access policies, the job may be denied 318 access.

Figure 4:
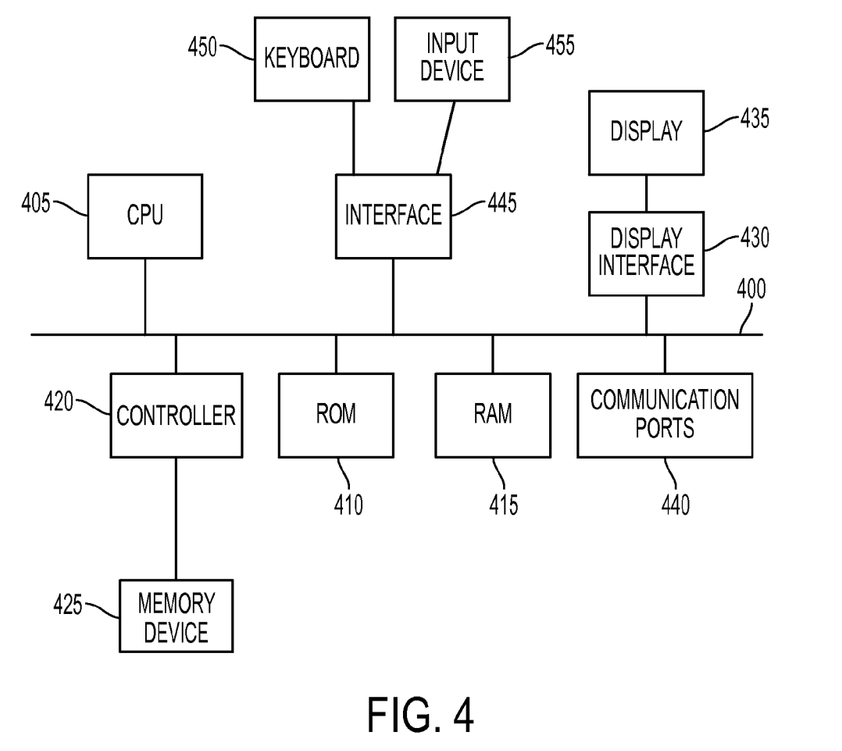
FIG. 4 illustrates a block diagram of example hardware that may be used to contain or implement program instructions according to an embodiment.

FIG. 4 is a block diagram of example hardware that may be used to contain or implement program instructions according to an embodiment. A bus 400 serves as the main information pathway interconnecting the other illustrated components of the hardware. CPU 405 is the central processing unit of the system, performing calculations and logic operations required to execute a program. Read only memory (ROM) 410 and random access memory (RAM) 415 constitute example memory devices.

A controller 420 interfaces one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices.

Program instructions may be stored in the ROM 410 and/or the RAM 415. Optionally, program instructions may be stored on a tangible computer readable storage medium such as a hard disk, compact disk, a digital disk, flash memory, a memory card, a USB drive, an optical disc storage medium, such as Blu-ray™ disc, and/or other recording medium.

An optional display interface 430 may permit information from the bus 400 to be displayed on the display 435 in audio, visual, graphic or alphanumeric format. Communication with external devices may occur using various communication ports 440. An example communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

What is claimed is:

1. A method of controlling access to one or more data resources, the method comprising:
- receiving, from a client device by an authentication server device, a request on behalf of a job to permit the job to access a data resource, wherein the request comprises a job identifier associated with the job;
- transmitting, by the authentication server device to a scheduling server device that launched the job, the job identifier;
- receiving, by the authentication server device from the scheduling server device, job information associated with the job, wherein the job information comprises an indication of one or more job sets to which the job belongs and a role associated with a user under whose authority the job is running, wherein the job set represents a function associated with the job, wherein the role defines one or more capabilities that the user is able to perform on the data resource;
- determining, by the authentication server device, whether at least a portion of the job information satisfies an access policy associated with the data resource by determining whether the one or more received job sets match at least one of the authorized job sets specified by the access policy by determining whether the received role matches an authorized role specified by the access policy; and
- granting the job access to the data resource in response to determining that the received role matches the authorized role.

2. The method of claim 1, wherein receiving the job information associated with the job comprises receiving one or more of:
- an indication of the client device on which the job is executing;
- data associated with the job;
- one or more command line arguments associated with the job;
- one or more dependencies associated with the job;
- one or more binaries associated with the job;
- a software version associated with the job; or
- one or more security settings associated with the client device on which the job is executing.

3. A method of controlling access to one or more data resources, the method comprising:
- receiving, from a client device by an authentication server device, a request on behalf of a job to permit the job to access a data resource, wherein the request comprises a job identifier associated with the job;
- transmitting, by the authentication server device to a scheduling server device that launched the job, the job identifier;
- receiving, by the authentication server device from the scheduling server device, job information associated with the job, wherein the job information comprises an indication of one or more job sets to which the job belongs and a role associated with a user under whose authority the job is running, wherein the job set represents a function associated with the job, wherein the role defines one or more capabilities that the user is able to perform on the data resource;
- determining, by the authentication server device, whether at least a portion of the job information satisfies an access policy associated with the data resource by determining whether the one or more received job sets match at least one of the authorized job sets specified by the access policy by determining whether the received role matches an authorized role specified by the access policy; and
- denying the job access to the data resource in response to determining that the received role does not match the authorized role.

4. The method of claim 3, wherein receiving the job information comprises receiving one or more of:
- an indication of the client device on which the job is executing;
- data associated with the job;
- one or more command line arguments associated with the job;
- one or more dependencies associated with the job;
- one or more binaries associated with the job;
- a software version associated with the job; or
- one or more security settings associated with the client device on which the job is executing.

5. The method of claim 3, wherein denying the job access to the data resource comprises sending a notification to the client device, wherein the notification comprises an indication that the job does not have sufficient authority to access the data resource.

6. A system for controlling access to one or more data resources, the system comprising:
- a computing device; and
- a computer-readable storage medium in communication with the computing device, wherein the computer-readable storage medium comprises one or more programming instructions that, when executed, cause the computing device to:
  - receive, from a client device, a request on behalf of a job to permit the job to access a data resource, wherein the request comprises a job identifier associated with the job,
  - transmit, to a scheduling server device that launched the job, the job identifier,
  - receive, from the scheduling server device, job information associated with the job, wherein the job information comprises an indication of one or more job sets to which the job belongs and a role associated with a user under whose authority the job is running, wherein the job set represents a function associated with the job, wherein the role defines one or more capabilities that the user is able to perform on the data resource,
  - determine whether at least a portion of the job information satisfies an access policy associated with the data resource by determining whether the one or more received job sets match at least one of the authorized job sets specified by the access policy by determining whether the received role matches an authorized role specified by the access policy, and
  - grant the job access to the data resource in response to determining that the received role matches the authorized role.

7. The system of claim 6, wherein the one or more programming instructions that, when executed cause the computing device to receive the job information associated with the job comprise one or more programming instructions that, when executed, cause the computing device to receive one or more of:
- an indication of the client device on which the job is executing;
- data associated with the job;
- one or more command line arguments associated with the job; or
- one or more dependencies associated with the job.

8. A system for controlling access to one or more data resources, the system comprising:
- a computing device; and
- a computer-readable storage medium in communication with the computing device, wherein the computer-readable storage medium comprises one or more programming instructions that, when executed, cause the computing device to:
  - receive, from a client device, a request on behalf of a job to permit the job to access a data resource, wherein the request comprises a job identifier associated with the job,
  - transmit, to a scheduling server device that launched the job, the job identifier,
  - receive, from the scheduling server device, job information associated with the job, wherein the job information comprises an indication of one or more job sets to which the job belongs and a role associated with a user under whose authority the job is running, wherein the job set represents a function associated with the job, wherein the role defines one or more capabilities that the user is able to perform on the data resource,
  - determine whether at least a portion of the job information satisfies an access policy associated with the data resource by determining whether the one or more received job sets match at least one of the authorized job sets specified by the access policy by determining whether the received role matches an authorized role specified by the access policy, and
  - deny the job access to the data resource in response to determining that the received role does not match the authorized role.

9. The system of claim 8, wherein the one or more programming instructions that, when executed cause the computing device to receive the job information associated with the job comprise one or more programming instructions that, when executed, cause the computing device to receive one or more of:
- an indication of the client device on which the job is executing;
- data associated with the job;
- one or more command line arguments associated with the job; or
- one or more dependencies associated with the job.

10. The system of claim 8, wherein the one or more programming instructions that, when executed cause the computing device to deny the job access to the data resource comprise one or more programming instructions that, when executed cause the computing device to send a notification to the client device, wherein the notification comprises an indication that the job does not have sufficient authority to access the data resource.

* * * * *